US010061055B2

(12) United States Patent
Grau et al.

(10) Patent No.: US 10,061,055 B2
(45) Date of Patent: Aug. 28, 2018

(54) ABSOLUTE ELEMENTAL CONCENTRATIONS FROM NUCLEAR SPECTROSCOPY

(75) Inventors: Jim A. Grau, Marshfield, MA (US); Markus Berheide, Medford, MA (US); Christian Stoller, Princeton Junction, NJ (US); Brad Roscoe, West Chesterfield, NH (US); James Thornton, East Windsor, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1270 days.

(21) Appl. No.: 12/996,533

(22) PCT Filed: Jun. 29, 2009

(86) PCT No.: PCT/US2009/049070
§ 371 (c)(1),
(2), (4) Date: Oct. 30, 2013

(87) PCT Pub. No.: WO2010/002796
PCT Pub. Date: Jan. 7, 2010

(65) Prior Publication Data
US 2016/0195636 A1 Jul. 7, 2016

Related U.S. Application Data

(60) Provisional application No. 61/077,524, filed on Jul. 2, 2008.

(51) Int. Cl.
*G01V 5/08* (2006.01)
*G01V 5/10* (2006.01)

(52) U.S. Cl.
CPC .................. *G01V 5/104* (2013.01)

(58) Field of Classification Search
CPC ..................................................... G01V 5/104
See application file for complete search history.

(56) References Cited

U.S. PATENT DOCUMENTS 3,662,173 A 5/1972 Youmans
3,665,195 A 5/1972 Youmans
(Continued)

FOREIGN PATENT DOCUMENTS

FR 2883596 A1 9/2009
RU 2092876 C1 10/1997
(Continued)

OTHER PUBLICATIONS

Well Logging for Earth Scientists, p. 400-414, to Darwin V. Ellis, Julian M. Singer, Springer Science & Business Media, Jun. 18, 2008.*

(Continued)

*Primary Examiner* — Kenneth J Malkowski
(74) *Attorney, Agent, or Firm* — Michael Dae (57) ABSTRACT

Systems and methods for estimating absolute elemental concentrations of a subterranean formation from neutron-induced gamma-ray spectroscopy are provided. In one example, a system for estimating an absolute yield of an element in a subterranean formation may include a downhole tool and data processing circuitry. The downhole tool may include a neutron source to emit neutrons into the formation, a neutron monitor to detect a count rate of the emitted neutrons, and a gamma-ray detector to obtain gamma-ray spectra deriving at least in part from inelastic gamma-rays produced by inelastic scattering events and neutron capture gamma-rays produced by neutron capture events. The data processing circuitry may be configured to determine a relative elemental yield from the gamma-ray spectra and to determine an absolute elemental yield based (Continued)

at least in part on a normalization of the relative elemental yield to the count rate of the emitted neutrons.

19 Claims, 4 Drawing Sheets

(56) References Cited

U.S. PATENT DOCUMENTS

| | | | |
|---|---|---|---|
| 3,707,700 A | 12/1972 | Lafont | |
| 3,829,687 A | 8/1974 | Caldwell | |
| 3,943,362 A | 3/1976 | Peelman | |
| 4,085,798 A | 4/1978 | Schweitzer et al. | |
| 4,102,185 A | 7/1978 | Dowling et al. | |
| 4,151,413 A | 4/1979 | Arnold | |
| 4,350,888 A | 9/1982 | Peelman | |
| 4,390,783 A | 6/1983 | Grau | |
| 4,604,522 A | 8/1986 | Arnold | |
| 4,712,007 A | 12/1987 | Ondrik | |
| 4,721,853 A | 1/1988 | Wraight | |
| 4,760,252 A | 7/1988 | Albats et al. | |
| 4,810,876 A | 3/1989 | Wraight et al. | |
| 4,926,044 A | 5/1990 | Wraight | |
| 5,021,653 A | 6/1991 | Roscoe et al. | |
| 5,097,123 A * | 3/1992 | Grau | G01V 5/101 250/264 |
| 5,219,518 A | 6/1993 | McKeon et al. | |
| 5,237,594 A | 8/1993 | Carroll | |
| 5,322,126 A | 6/1994 | Scott, III | |
| 5,404,752 A | 4/1995 | Chace et al. | |
| 5,413,179 A | 5/1995 | Scott, III | |
| 5,441,110 A | 8/1995 | Scott, III | |
| 5,471,057 A * | 11/1995 | Herron | G01V 5/101 250/265 |
| 5,539,225 A | 7/1996 | Loomis et al. | |
| 5,543,617 A | 8/1996 | Roscoe et al. | |
| 5,608,215 A | 3/1997 | Evans | |
| 5,699,246 A | 12/1997 | Plasek et al. | |
| 5,804,820 A | 9/1998 | Evans et al. | |
| 5,900,627 A | 5/1999 | Odom et al. | |
| 6,125,934 A | 10/2000 | Lenn et al. | |
| 6,150,655 A | 11/2000 | Odom et al. | |
| 6,703,606 B2 | 3/2004 | Adolph | |
| 7,365,307 B2 | 4/2008 | Stoller et al. | |
| 7,365,308 B2 | 4/2008 | Trcka et al. | |
| 7,366,615 B2 | 4/2008 | Herron et al. | |
| 7,642,507 B2 | 1/2010 | Schlumberger | |
| 8,969,793 B2 | 3/2015 | Stoller et al. | |
| 2002/0130258 A1 | 9/2002 | Odom et al. | |
| 2002/0170348 A1 | 11/2002 | Roscoe et al. | |
| 2003/0029995 A1 | 2/2003 | Mullins et al. | |
| 2005/0067563 A1 | 3/2005 | Gilchrist et al. | |
| 2005/0121606 A1 | 6/2005 | Gilchrist et al. | |
| 2005/0139759 A1 | 6/2005 | Pitts et al. | |
| 2005/0284626 A1 | 12/2005 | Riley et al. | |
| 2006/0033023 A1 | 2/2006 | Pemper et al. | |
| 2006/0065824 A1 | 3/2006 | Mickael | |
| 2006/0180754 A1 | 8/2006 | Edwards et al. | |
| 2006/0226351 A1 | 10/2006 | Stoller et al. | |
| 2006/0284066 A1 | 12/2006 | Jacobson | |
| 2007/0023625 A1 | 2/2007 | Trcka et al. | |
| 2007/0034373 A1 | 2/2007 | McDaniel et al. | |
| 2007/0057171 A1 | 3/2007 | Stoller et al. | |
| 2008/0251710 A1 | 10/2008 | Riley et al. | |
| 2009/0045329 A1 | 2/2009 | Stoller | |
| 2009/0205825 A1 | 8/2009 | Smith, Jr. et al. | |
| 2009/0090505 A1 | 9/2009 | McDaniel | |

FOREIGN PATENT DOCUMENTS

| | | |
|---|---|---|
| RU | 2262124 C1 | 10/2005 |
| WO | WO2009026065 A2 | 2/2009 |
| WO | WO2010002727 A2 | 1/2010 |

OTHER PUBLICATIONS

International Search Report and Written Opinion for International Application No. PCT/US2009/049070 dated Aug. 25, 2010.
International Preliminary Report on Patentability for International Application No. PCT/US2009/049070 dated Jan. 5, 2011.
Westaway, Peter, Hertzog, R.C., and Plasek, R.E., "Neutron-Induced Gamma Ray Spectroscopy for Reservoir Analysis," Jun. 1983, Society of Petroleum Engineers Journal, Paper SPE 9461-PA, pp. 553-564, (1983).
Examination Report issued in the related AU Application 2009267178, dated Feb. 7, 2014 (3 pages).
Examination Report issued in the related CA Application 2729550, dated Jul. 14, 2015 (5 pages).
Office action issued in the related CN Application 200980125733.5, dated Jun. 20, 2012 (14 pages).
Office action issued in the related CN Application 200980125733.5, dated Jan. 14, 2013 (14 pages).
Westaway, Peter, Hertzog, R.C., and Plasek, R.E., Gamma Spectrometer Tool Inelastic and Capture Gamma-Ray Spectroscopy for Reservoir Analysis, 1980, Society of Petroleum Engineers of the American Institute of Mining, Metallurgical, and Petroleum Engineers Paper SPE 9461, 16 pages.
Examination Report issued in the related GB Application 1101020.4, dated Feb. 13, 2012 (2 pages).
Examination Report issued in the related GB Application 1101020.4, dated May 31, 2012 (6 pages).
Examination Report issued in the related GB Application 1101020.4, dated Nov. 1, 2012 (6 pages).
Examination Report issued in the related GC Application GCC/P/2009/13839, dated Aug. 8, 2014 (4 pages).
Office action issued in the related MX Application MX/A/2011/000008, dated Oct. 24, 2013 (7 pages).
Office action issued in the related RU Application 2011103537, dated Mar. 14, 2013 (11 pages).
Decision of Grant issued in the related RU Application 2011103537, dated Jun. 28, 2013 (11 pages).
Office Action issued in the related CA application 2729642, dated Sep. 29, 2015 (5 pages).
Office Action issued in the related RU application 2011103563, dated Mar. 6, 2013 (2 pages).
Decision of Grant issued in the related RU application 2011103563, dated Jun. 28, 2013 (8 pages).
International Search Report and Written Opinion issued in the PCT application PCT/US2009/048810, dated Jun. 1, 2010 (19 pages).
International Preliminary Report on patentability issued in the PCT application PCT/US2009/048810, dated Jan. 5, 2011 (14 pages).
Office action issued in the related NO Application 20110758, dated Aug. 18, 2017 (16 pages).
Office action issued in the related NO Application 20110035, dated Jun. 8, 2017 (7 pages).

* cited by examiner

ABSOLUTE ELEMENTAL CONCENTRATIONS FROM NUCLEAR SPECTROSCOPY

CROSS REFERENCE TO RELATED APPLICATIONS

The present application is a National Stage entry of PCT/US09/49070 filed on Jun. 29, 2009 which claims priority from U.S. Provisional Patent Application Ser. No. 61/077,524 filed on Jul. 2, 2008, both the applications are incorporated by reference in their entirety.

BACKGROUND

The present disclosure relates generally to neutron-induced gamma-ray spectroscopy and, more particularly, to techniques for determining absolute elemental concentrations from neutron-induced gamma-ray spectroscopy.

Using nuclear downhole tools, the elemental concentration of a subterranean formation may be determined using a variety of techniques. An indirect determination of formation lithology may be obtained using information from density and photoelectric effect (PEF) measurements from gamma-ray scattering in the formation. A direct detection of formation elements may be obtained by detecting neutron-induced gamma-rays. Neutron-induced gamma-rays may be created when a neutron source emits neutrons into a formation, which may interact with formation elements through inelastic scattering, high-energy nuclear reactions, or neutron capture.

Gamma-rays emitted in inelastic scattering events ("inelastic gamma-rays") or neutron capture events ("neutron capture gamma-rays") may have characteristic energies that, based on various spectroscopy techniques, may identify the particular isotopes that emitted the gamma-rays. Techniques involving inelastic spectroscopy interpretation may be based on ratios of elemental yields attributable to inelastic gamma-rays of various characteristic energies. Most notably, the ratio of the number of detected gamma-rays due to carbon versus those due to oxygen ("C/O ratio") has been used to estimate formation oil saturation. An advantage of using a ratio is that some instrumental effects, such as variable neutron output and a number of environmental effects, will cancel out. A disadvantage of using a ratio is that it is usually more difficult to interpret. For the simple case of estimating oil saturation in a water-filled borehole, the C/O ratio may be complicated by gamma-rays attributable to oxygen from borehole fluid and the cement annulus, whereas all gamma-rays attributable to carbon would derive from the formation.

Similar techniques involving neutron capture spectroscopy may involve collecting and analyzing neutron gamma ray energy spectra. Elements typically included in a neutron capture spectrum may include Si, Ca, Fe, S, Ti, Gd, H, Cl, and others, and sometimes Al, Na, Mg, Mn, Ni, and other minor or trace elements. However, the elemental concentrations determined using such techniques may also generally identify only relative concentrations of formation elements, unless an absolute concentration of a formation element is already known or properly estimated.

Certain other techniques for estimating absolute elemental concentrations in a formation may involve oxide closure normalization of spectroscopy log data, or may involve supplementing spectroscopy log data with activation and/or natural gamma-ray measurements. However, closure normalization may depend on accurate associations for unmeasured elements, which may change depending on the exact assembly of formation elements. Additionally, closure normalization may depend on using all elements that may influence the spectrum (except K and Al), some of which may not be as precisely determined as others. The use of activation and/or natural gamma-ray measurements may also have various disadvantages. In particular, such measurements may often involve highly complex tools and long measurement times.

SUMMARY

Certain aspects commensurate in scope with the originally claimed embodiments are set forth below. It should be understood that these aspects are presented merely to provide the reader with a brief summary of certain forms the embodiments might take and that these aspects are not intended to limit the scope of the embodiments. Indeed, the embodiments may encompass a variety of aspects that may not be set forth below.

Present embodiments generally relate to systems and methods for estimating absolute elemental concentrations in a subterranean formation using neutron-induced spectroscopy. For example, a system for estimating an absolute yield of an element in a subterranean formation may include a downhole tool and data processing circuitry. The downhole tool may include a neutron source to emit neutrons into the formation, a neutron monitor to detect a count rate of the emitted neutrons, and a gamma-ray detector to obtain gamma-ray spectra deriving at least in part from inelastic gamma-rays produced by inelastic scattering events and neutron capture gamma-rays produced by neutron capture events. The data processing circuitry may be configured to determine a relative elemental yield from the gamma-ray spectra and to determine an absolute elemental yield based at least in part on a normalization of the relative elemental yield to the count rate of the emitted neutrons.

BRIEF DESCRIPTION OF THE DRAWINGS

Advantages of the present disclosure may become apparent upon reading the following detailed description and upon reference to the drawings in which.

DETAILED DESCRIPTION OF SPECIFIC EMBODIMENTS

One or more specific embodiments are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the presently disclosed subject matter relate generally to systems and methods for neutron-induced gamma-ray spectroscopy. In particular, the presently disclosed subject matter relates to techniques for determining absolute elemental concentrations of a subterranean formation. These techniques may involve causing inelastic scattering events and neutron capture events in a subterranean formation by bombarding the formation with neutrons, which may cause the emission of inelastic and neutron capture gamma-rays. The inelastic and neutron capture gamma-rays may have energy spectra that are characteristic to the elements from which they derive.

The quantity of emitted neutrons may be monitored or otherwise known, and the resulting gamma-ray spectra may be measured and normalized to the monitored neutron output. It has been determined that estimates of the absolute elemental concentrations can be derived from the absolute gamma-ray spectroscopy elemental yields, which may be refer to the gamma-ray spectroscopy yield normalized by the monitored or known neutron output and various environmental corrections to account for formation and/or borehole properties. As used herein, the term "absolute yields" is not meant to imply that the gamma-ray spectroscopy measurement is carried out with reference to a known formation element. Rather, no direct measurement of other elements may be needed to derive an empirical closure factor according to the techniques described below.

Figure 1:
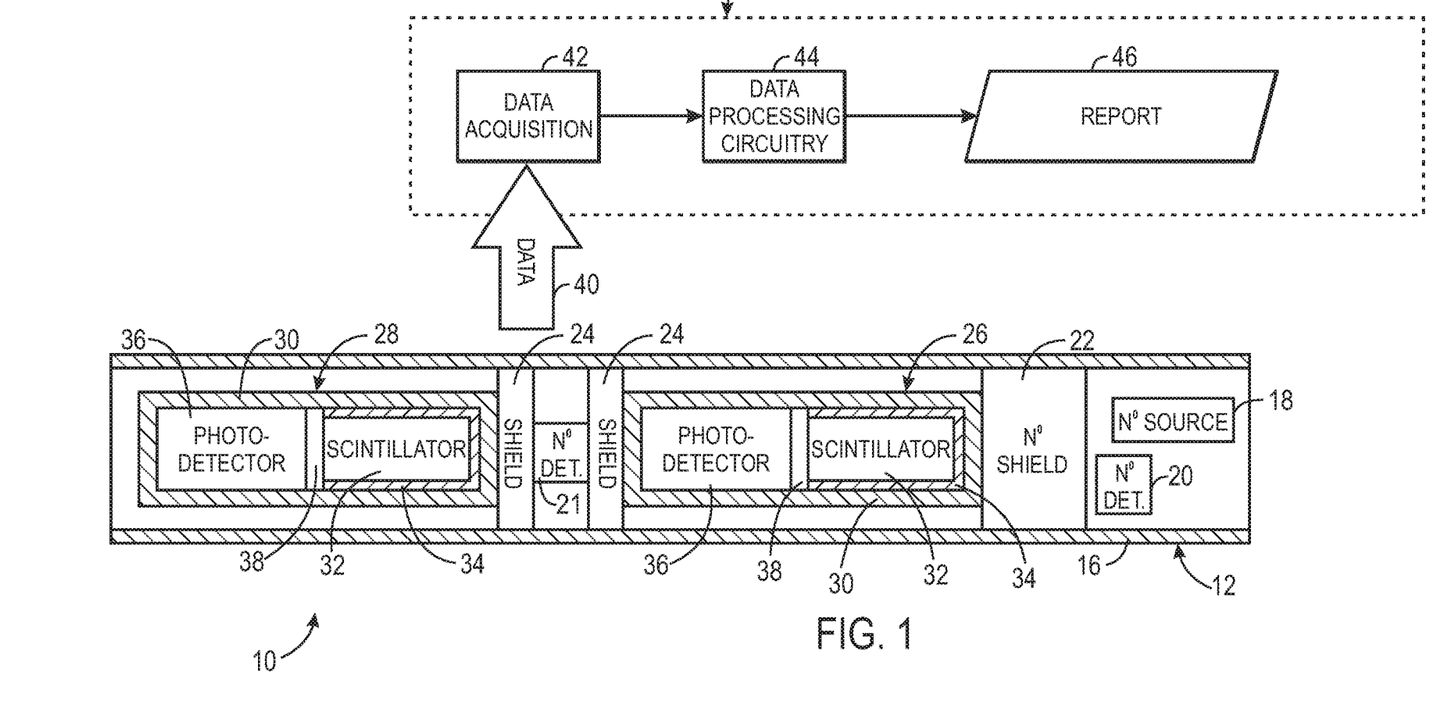
FIG. 1 is a schematic block diagram of a system including a downhole tool and data processing circuitry for measuring absolute elemental concentrations based on spectral analysis of neutron-induced gamma-rays, in accordance with an embodiment.

With the foregoing in mind, FIG. 1 illustrates a system 10 for determining absolute elemental concentrations of a subterranean formation that includes a downhole tool 12 and a data processing system 14. By way of example, the downhole tool 12 may be a slickline or wireline tool for logging an existing well, or may be installed in a borehole assembly for logging while drilling (LWD). The data processing system 14 may be incorporated into the downhole tool 12 or may be at a remote location. The downhole tool 12 may be surrounded by a housing 16.

The downhole tool 12 may include a neutron source 18 configured to emit neutrons into a subterranean formation. By way of example, the neutron source 18 may be an electronic neutron source, such as a Minitron™ by Schlumberger Technology Corporation, which may produce pulses of neutrons through d-D and/or d-T reactions. Additionally or alternatively, the neutron source 18 may be a radioactive source, such as an AmBe or $^{252}$Cf source.

The neutron output of the neutron source 18 may be known through the use of various techniques. For example, if the neutron source 18 includes a radioactive source, the absolute output of the neutron source 18 may be determined through calibration. Additionally, the absolute output of the neutron source 18 may be determined by computing the change of neutron source 18 activity as a function of the time since a calibration, since a radioactive source may follow a known exponential decay law and may have a known half-life.

If the neutron source 18 includes an electronic neutron generator, a given instantaneous output of the neutron source 18 may depend upon many parameters that control the generation of neutrons and, thus, the neutron output of the neutron source 18. These parameters may include the ion beam current supplied inside the neutron generator tube, the accelerating high voltage applied to the tube, and the operation of the ion source, among other things. However, even if all of these parameters are closely regulated, a constant neutron output may not be assured, as short term fluctuations in neutron output may arise due to changes in neutron generator operating characteristics with time and temperature. Additionally, longer term changes due to the aging of the generator tube may further impact the neutron output of the neutron source 18.

Accordingly, in some embodiments, a neutron monitor 20 may monitor the neutron output from the neutron source 18. The neutron monitor 20 may be, for example, a plastic scintillator and photomultiplier that may primarily detect unscattered neutrons directly from the neutron source 18, and may provide a count rate signal proportional to the neutron output rate from the neutron source 18. As discussed in greater detail below, the neutron output, whether determined through calibration of the neutron source 18 and/or appropriate calculations, or through the use of the neutron monitor 20, may be used for determining absolute spectral yields attributable to various formation elements.

A neutron shield 22 may separate the neutron source 18 from various detectors in the downhole tool 12. A similar shield 24, which may contain elements such as lead, may prevent gamma-rays from traveling between the various detectors of the downhole tool 12. The downhole tool 12 may further include one or more gamma-ray detectors, and may include three or more gamma-ray detectors. The downhole tool 12 illustrated in FIG. 1 includes two gamma-ray detectors 26 and 28. The relative positions of the gamma-ray detectors 26 and/or 28 in the downhole tool 12 may vary.

The gamma-ray detectors 26 and/or 28 may be contained in respective housings 30. Scintillator crystals 32 in the gamma-ray detectors 26 and/or 28 may enable detection counts or spectra of gamma-rays by producing light when gamma-rays scatter or are captured in the scintillator crystals 32. The scintillator crystals 32 may be inorganic scintillation detectors containing, for example, NaI(Tl), LaCl$_3$, LaBr$_3$, BGO, GSO, YAP, and/or other suitable materials. Housings 34 may surround the scintillator crystals 32. Photodetectors 36 may detect light emitted by the scintillator crystals 32 when a gamma-ray is absorbed and the light has passed through an optical window 38. The gamma-ray detectors 26 and/or 28 may be configured to obtain a gamma-ray count and/or gamma-ray spectra, and may thus include a gamma-ray pulse height analyzer.

One or more neutron detectors 21 may be located elsewhere in the downhole tool 12, and may be used for determining various environmental correction factors, as described below. In particular, the one or more neutron detectors 21 may be thermal, epithermal, or fast neutron detectors that may allow measurement of a dependence on the thermal and/or epithermal neutron flux in the vicinity of the gamma-ray detectors 26 and/or 28. This thermal and/or epithermal neutron flux may be measured or estimated by the one or more neutron detectors 21 located away from the neutron source 18.

The signals from the neutron monitor 20, the one or more neutron detectors 21, and gamma-ray detectors 26 and/or 28 may be transmitted to the data processing system 14 as data 40 and/or may be processed or preprocessed by an embedded processor in the downhole tool 12. The data processing system 14 may include a general-purpose computer, such as a personal computer, configured to run a variety of software, including software implementing all or part of the present techniques. Alternatively, the data processing system 14 may include, among other things, a mainframe computer, a distributed computing system, or an application-specific computer or workstation configured to implement all or part of the present technique based on specialized software and/or hardware provided as part of the system. Further, the data processing system 14 may include either a single processor or a plurality of processors to facilitate implementation of the presently disclosed functionality.

In general, the data processing system 14 may include data processing circuitry 44, which may be a microcontroller or microprocessor, such as a central processing unit (CPU), which may execute various routines and processing functions. For example, the data processing circuitry 44 may execute various operating system instructions as well as software routines configured to effect certain processes and stored in or provided by a manufacture including a computer readable-medium, such as a memory device (e.g., a random access memory (RAM) of a personal computer) or one or more mass storage devices (e.g., an internal or external hard drive, a solid-state storage device, CD-ROM, DVD, or other storage device). In addition, the data processing circuitry 44 may process data provided as inputs for various routines or software programs, including the data 40.

Such data associated with the present techniques may be stored in, or provided by, the memory or mass storage device of the data processing system 14. Alternatively, such data may be provided to the data processing circuitry 44 of the data processing system 14 via one or more input devices. In one embodiment, data acquisition circuitry 42 may represent one such input device; however, the input devices may also include manual input devices, such as a keyboard, a mouse, or the like. In addition, the input devices may include a network device, such as a wired or wireless Ethernet card, a wireless network adapter, or any of various ports or devices configured to facilitate communication with other devices via any suitable communications network, such as a local area network or the Internet. Through such a network device, the data processing system 14 may exchange data and communicate with other networked electronic systems, whether proximate to or remote from the system. The network may include various components that facilitate communication, including switches, routers, servers or other computers, network adapters, communications cables, and so forth.

The downhole tool 12 may transmit the data 40 to the data acquisition circuitry 42 of the data processing system 14 via, for example, a telemetry system communication downlink or a communication cable. After receiving the data 40, the data acquisition circuitry 42 may transmit the data 40 to data processing circuitry 44. In accordance with one or more stored routines, the data processing circuitry 44 may process the data 40 to ascertain one or more properties of a subterranean formation surrounding the downhole tool 12. Such processing may involve, for example, one or more techniques for estimating absolute yields of formation elements based on absolute inelastic and/or neutron capture gamma-ray spectral yields. The data processing circuitry 44 may thereafter output a report 46 indicating the one or more ascertained properties of the formation. The report 46 may be stored in memory or may be provided to an operator via one or more output devices, such as an electronic display and/or a printer.

Figure 2:
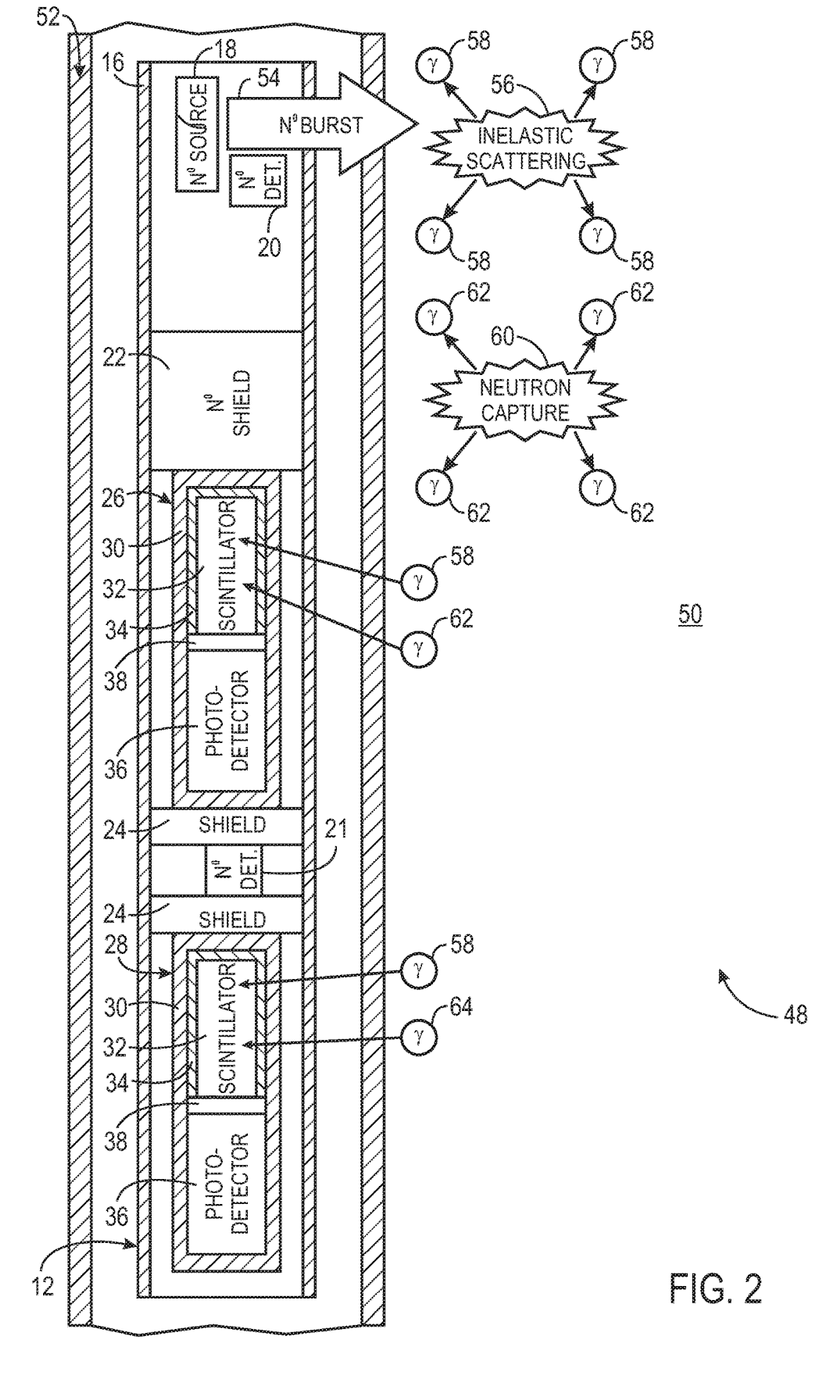
FIG. 2 is a schematic block diagram of a well logging operation using the downhole tool of FIG. 1, in accordance with an embodiment.

FIG. 2 illustrates a neutron-induced gamma-ray well-logging operation 48, which involves the placement of the downhole tool 12 into a surrounding subterranean formation 50. In the operation 48 depicted in FIG. 2, the downhole tool 12 has been lowered into a borehole 52. The well-logging operation 48 may begin when the neutron source 18 outputs neutrons 54 into the surrounding formation 50. If the neutron source 18 emits neutrons of approximately 14.1 MeV, for example, the 14.1 MeV neutrons may collide with nuclei in the surrounding formation 50 through inelastic scattering events 56, which may produce inelastic gamma-rays 58 and may cause the neutrons of the burst of neutrons 54 to lose energy. As the neutrons 54 lose energy to become epithermal and thermal neutrons, they may be absorbed by formation 50 nuclei in neutron capture events 60, which may produce neutron capture gamma-rays 62. If the neutron source 18 emits only neutrons 54 of an energy insufficient to result in inelastic scattering events, substantially only neutron capture events 60 may occur.

The inelastic gamma-rays 58 and/or neutron capture gamma-rays 62 may be detected by the gamma-ray detectors 26 and/or 28. As noted briefly above, the spectra of the gamma-rays 58 and 62 may be characteristic to the elements from which they derive. As such, the spectra of the gamma-rays 58 and/or 62 may be analyzed to determine elemental yields.

Concurrently, the neutron monitor 20 near the neutron source 18 may measure the absolute neutron output of the neutron source 18. As described further below, a relationship between the detected gamma-ray 58 and/or 62 spectra and the absolute neutron output of the neutron source 18 may indicate an absolute elemental yield. Several complications may arise, however, due to environmental effects of the formation 50 and borehole 52. For example, the gamma-ray detectors 26 and/or 28 may generally only be capable of detecting inelastic gamma-rays 58 and/or neutron capture gamma-rays 62 that arise in a certain region of the formation 50 proximate to the respective gamma-ray detector 26 or 28. A fraction of the total neutron 54 flux may escape from such regions, and this fraction may depend on various environmental factors. When fewer neutrons 54 reach the region of the formation 50 that the gamma-ray detectors 26 and/or 28 are sensitive to, fewer detectable gamma-rays 58 and/or 62 may be produced. Slowing-down length is one factor that may contribute to this effect.

Similarly, because the neutron source 18 and the gamma-ray detectors 26 and/or 28 are not colocated, the neutron count rate measured by the one or more neutron detectors 21 may need to be corrected for geometrical effects on the variation of neutron flux in the region of the formation 50 that the gamma-ray detectors 26 and/or 28 are sensitive to. Additional measurements from other tools and/or modeling may be used to estimate the fraction of lost neutrons 54, as well as changes in the effective solid angle of the gamma-ray detectors 26 and/or 28. Several factors may contribute to this effect, many of which may be accounted for using various parameters, as described below.

Another complication that may arise may be specific to the measurement of neutron capture gamma-rays 62. In particular, the quantity of thermal neutrons that reach the volume of the formation 50 detectable by the gamma-ray detectors 26 and/or 28 may not be directly proportional to the absolute neutron output of high-energy (e.g., 14.1 MeV) neutrons. Rather, the thermal neutron flux may depend on the neutron transport and lifetime of the thermal neutrons through the formation 50 prior to capture. As such, additional measurements from other tools and/or modeling may be used to estimate the fraction of thermal neutrons that reach the volume of the formation 50 detectable by the gamma-ray detectors 26 and/or 28. One factor in such a calculation may be a sigma measurement of the formation 50, which represents a macroscopic thermal neutron capture cross-section of the formation 50.

The attenuation of the gamma-rays 58 and/or 62 may also be affected by the environment of the formation 50. As this gamma-ray attenuation may be influenced by a formation density of the formation 50, such a measurement may be used to account for these effects. Finally, the presence of the borehole 52 may also complicate the obtained measurements of the gamma-rays 58 and/or 62 by the gamma-ray detectors 26 and/or 28. The environmental effects of the borehole 52 may be accounted for using additional measurements of borehole 52 parameters and/or modeling, which may include borehole 52 diameter and/or a measurement or estimation of the sigma of the borehole 52.

If the downhole tool 12 includes a neutron detector 21 proximate to the gamma-ray detector 26 and/or 28, this neutron detector 21 may be used to measure the thermal and/or epithermal neutron flux associated with the region of the formation 50 and/or borehole 52 detectable by the gamma-ray detector 26 and/or 28. These measurements may reveal certain formation 50 environmental characteristics, which may be corrected for using the techniques described below.

Figure 3:
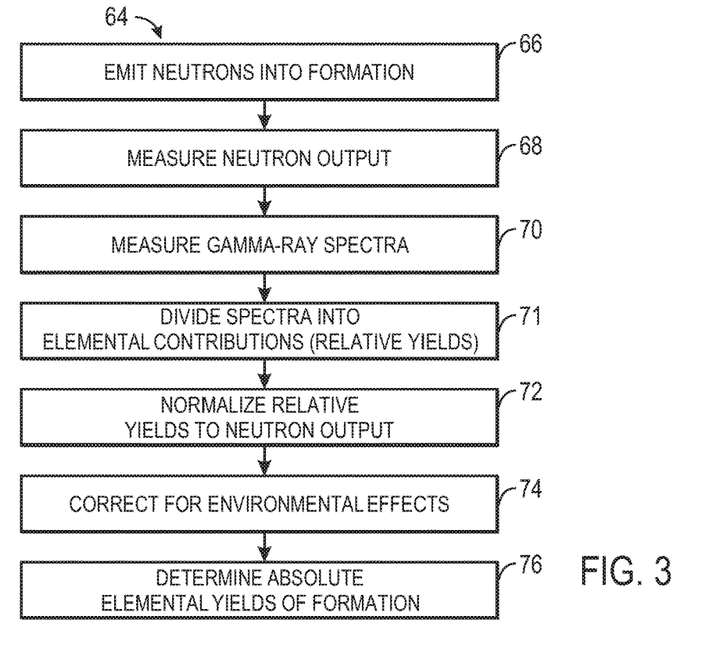
FIG. 3 is a flowchart describing an embodiment of a method for determining absolute elemental yields in a formation based on neutron-induced gamma-ray measurements, in accordance with an embodiment.
Figure 4:
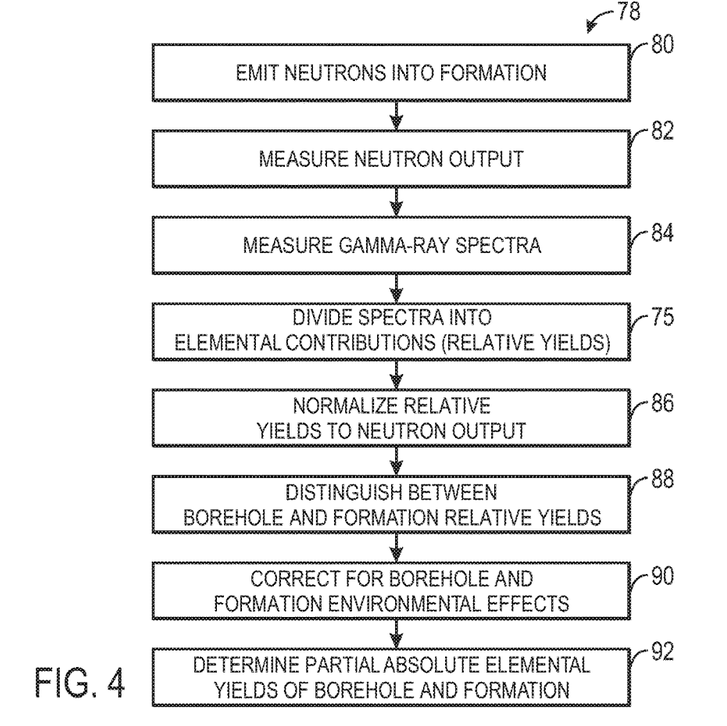
FIG. 4 is a flowchart describing an embodiment of a method for determining partial absolute elemental yields in a formation and a borehole based on neutron-induced gamma-ray measurements, in accordance with an embodiment.

FIGS. 3 and 4 represent various embodiments of methods for determining absolute elemental yields from detected gamma-ray spectra. The techniques described in FIGS. 3 and 4 represent techniques that may involve the use of the downhole tool 12 and/or the data processing system 14. Turning first to FIG. 3, a flowchart 64 begins with step 66, when the downhole tool 12 is lowered into the formation 50 and the neutron source 18 of the downhole tool 12 emits neutrons 54 into the surrounding formation 50. In step 68, which may take place concurrently with step 66, the absolute neutron output of the neutron source 18 may be measured using the neutron monitor 20 near the neutron source 18. Additionally or alternatively, the absolute neutron output of the neutron source 18 may be estimated at a later time based on neutron source 18 calibration and radioactive decay models. In step 70, the gamma-ray detectors 26 and/or 28 may measure the spectra of inelastic and neutron capture gamma-rays 58 and/or 62 that may be produced when the neutrons 54 interact with the formation 50.

Steps 71-76 may generally involve processing steps that may take place in a processor embedded in the downhole tool 12 and/or in the data processing system 14. In step 71, the measured gamma-ray spectra may be divided into elemental contributions, or relative elemental yields. In step 72, these relative elemental yields from gamma-rays attributable to a spectral region of interest may be normalized to the neutron output of the neutron source 18, which may produce an uncorrected absolute elemental yield of the formation 50. In step 74, various factors may be considered to correct for environmental effects of the formation 50 and/or the borehole 52 that may influence the measured gamma-ray 58 and/or 62 spectra. In step 76, based on the above relationships, one or more absolute elemental concentrations of the formation 50 may be determined, as described below with reference to Equation (1). These steps may be accomplished in any order, and may begin by calculating, for example, the following relationship:

$$A_i = Y_i * \text{TotCR} * F(\text{parameter-1}, \text{parameter-2}, \ldots)/nCR \qquad (1).$$

In Equation (1) above, $A_i$ represents the absolute yields for each element i. $Y_i$ represents the relative elemental yields, or the fraction of the measured gamma-ray spectra attributed to element i. TotCR represents the total count rate within the region of the spectrum used in the spectral analysis to extract the relative yields. nCR represents the determined neutron 54 output from the neutron source 18, as obtained through an absolute neutron count measurement by the neutron monitor 20 and/or through estimation by calibration or radioactive decay models. F represents an environmental correction factor accounting for borehole 52 and/or formation 50 parameters. As mentioned above, such environmental corrections may account for neutron transport and gamma-ray attenuation, among other things. These environmental corrections and parameters are discussed in greater detail below.

In FIG. 4, a flowchart 78 describes an embodiment of a method for determining partial absolute yields of elemental concentrations in the formation 50 and the borehole 52. The flowchart 78 begins with step 80, when the downhole tool 12 is lowered into the formation 50 and the neutron source 18 of the downhole tool 12 emits neutrons 54 into the surrounding formation 50. In step 82, which may take place concurrently with step 80, the absolute neutron output of the neutron source 18 may be measured using the neutron monitor 20 near the neutron source 18. Additionally or alternatively, the absolute neutron output of the neutron source 18 may be estimated at a later time based on neutron source 18 calibration or radioactive decay models. In step 84, the gamma-ray detectors 26 and/or 28 may measure the spectra of inelastic and neutron capture gamma-rays 58 and/or 62 that may be produced when the neutrons 54 interact with the formation 50.

Steps 85-92 may generally involve processing steps that may take place in a processor embedded in the downhole tool 12 and/or in the data processing system 14. In step 71, the measured gamma-ray spectra may be divided into elemental contributions, or relative elemental yields. In step 86, these relative elemental yields from gamma-rays attributable to a spectral region of interest may be normalized to the neutron output of the neutron source 18, which may produce an uncorrected absolute elemental yield of the formation 50. In step 88, relative yields attributable to the formation 50 and the borehole 52 may be distinguished, and in step 90, various factors may be considered to correct for environmental effects of the formation 50 and/or the borehole 52 that may influence the measured gamma-ray 58 and/or 62 spectra. In step 92, the partial absolute environmental yields attributable to the formation 50 and the borehole 52 may be determined, as described below with reference to Equation (2).

In particular, for elements that coexist in the formation 50 and the borehole 52, the measured absolute yield $A_i$ may be considered a sum over the partial absolute yields in the formation 50 $A_{Fi}$ and the borehole 52 $A_{BHi}$. Under such conditions, it may be possible to distinguish between two possibilities, that there may be a significant spectral difference between the portions of the gamma-ray 58 and/or 62 spectrum arising from the formation 50 and from the borehole 52, and that there may be no usable detectable difference. If a difference between formation 50 and borehole 52 standard exists, it can be used to split the absolute yield $A_i$ into a formation 50 yield component $A_{F,i}$ and a borehole 52 yield component $A_{BH,i}$. A practical implementation may use either of the two standards separately, or may use the formation 50 standard and the difference between formation 50 and borehole 52 standard. In such a case, the correction factor F may also be split for formation and borehole section independently. The steps 85-92 may be accomplished in any order, and may begin by calculating, for example, the following relationship:

$$A_i = A_{F,i} + A_{BH,i} \qquad (2)$$
$$= (Y_{F,i} * F_F(\text{parameter-1, parameter-2, ...}) + Y_{BH,i} *$$
$$F_{BH}(\text{parameter-1, parameter-2, ...})) * TotCR/nCR.$$

In Equation (2) above, $A_i$ represents the absolute yields for each element i, and $A_{Fi}$ and $A_{BHi}$ represent the partial absolute yields of the element i in the formation 50 and borehole 52, respectively. $Y_{Fi}$ and $Y_{BHi}$ represent the relative elemental yields of the formation 50 and borehole 52, or the fraction of the measured gamma-ray spectra attributed to element i attributable to the formation 50 and borehole 52, respectively. TotCR represents the total count rate within the region of the spectrum used in the spectral analysis to extract the relative yields. nCR represents the determined neutron 54 output from the neutron source 18, as obtained through an absolute neutron count measurement by the neutron monitor 20 and/or through estimation by calibration or radioactive decay models. $F_F$ and $F_{BH}$ represent environmental correction factors accounting for formation 50 and borehole 52 parameters, respectively.

For both of the above-described embodiments of methods described by FIGS. 3 and 4 and Equations (1) and (2), the environmental correction factor(s) F may be a rather complicated function. The environmental correction factor(s) F may be factorized, and the dependence on most of the parameters may be determined through a series of Monte Carlo calculations. The environmental correction factor(s) F may also include a scaling factor determined by calibration of the final downhole tool 12 hardware. Additionally or alternatively, the scaling factor could be determined from a self-consistency analysis from the results of the closure normalization described above by Equations (1) or (2). An example of a scaling factor is provided below.

The parameters employed by the environmental correction factor(s) F (e.g., parameter-1, etc.) can be either common physical parameters measured, for example, by other sections of the downhole tool 12 designed for such a purpose, or by other tools. By way of example, such common physical parameters may include, among other things, porosity measurements or estimations, slowing-down time measurements or estimations, density measurements or estimations, formation or borehole thermal neutron capture cross section measurements or estimations, and so forth. One or more other parameters may derive from a different set of physical parameters not commonly reported by logging tools, which may have no explicit physical interpretation. For example, such other parameters may include, among other things, local neutron flux estimates proximate to the gamma-ray detectors 26 and/or 28, local neutron energy distribution estimates proximate to the gamma-ray detectors 26 and/or 28, raw neutron monitor 20 count rates, raw gamma-ray detector 26 and/or 28 count rates, and so forth. These other parameters may involve measurements using the one or more neutron detectors 21 located more closely to the gamma-ray detectors 26 and/or 28 than to the neutron source 18.

One or more of the factors F applied to the neutron capture gamma-ray 62 yield may contain a dependence on the thermal neutron flux in the vicinity of the gamma-ray detector 26 and/or 28. One implementation of such a factor F may contain a fraction between thermal neutron flux near the gamma-ray detector 26 and/or 28 and a measured neutron 54 flux, as measured by the one or more neutron detectors 21 and/or as estimated based on other formation 50 measurements. One or more of the factors F applied to the inelastic gamma-ray 58 yield may contain a dependence on the epithermal neutron flux in the vicinity of the gamma-ray detector 26 and/or 28. The thermal and/or epithermal neutron flux could be measured or estimated by one or more neutron monitors 20 away from the neutron monitor near the neutron source 18, or may be estimated based on other formation 50 measurements.

One or more of the factors F may contain a dependency on the gamma-ray attenuation in the vicinity of the gamma-ray detector 26 and/or 28. One or more of the factors F may contain a correction for variations in the gamma-ray attenuation in the tool housing 16, which may be due to environmental changes and/or wear. One or more of the factors F may contain a correction for downhole tool 12 background resulting from, for example, neutron capture events 60 that may occur in the materials that make up the downhole tool 12. One or more of the factors F may contain an estimate of the effective atomic number of the elements in the vicinity of the gamma-ray detector 26 and/or 28, as determined through other downhole measurements or using various other formation 50 modeling techniques.

One example of a formulation of the correction factor F is described below as Equation (3). The exemplary correction factor F described in Equation (3) may have dependencies on total formation neutron capture cross section ($\Sigma_F$), neutron slowing down length ($L_S$), bulk density ($\rho_b$), borehole fluid neutron capture cross section ($\Sigma_B$), and borehole diameter ($D_B$), and may be represented by the following relationship:

$$F = (\Sigma_F + g_1) * \exp(L_S/g_2) * \exp(\rho_b/g_3) * \exp(D_B/g_4) \qquad (3),$$

where $g_1$ and $g_2$ depend on $D_B$, $g_3$ depends on $L_S$, and $g_4$ depends on $\Sigma_B$.

Figure 5:
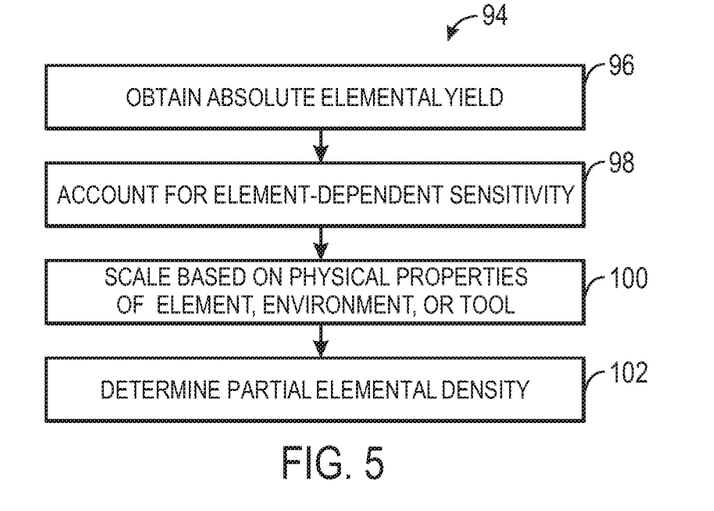
FIG. 5 is a flowchart describing an embodiment of a method for determining absolute elemental concentrations based on determined absolute elemental yields, in accordance with an embodiment.

FIG. 5 depicts a flowchart 96 for obtaining an elemental concentration of the formation 50. The steps of the flowchart 96 may generally involve processing that may take place in a processor embedded in the downhole tool 12 and/or in the data processing system 14. Specifically, a first step 96 may involve obtaining an absolute yield of an element or a partial yield of an element, which may be determined according to the flowcharts 64 or 78 of FIG. 3 or 4. In step 98, characteristics specific to the element being assessed may be accounted for and applied to the absolute yield of the element. These characteristics may be accounted for with an element-dependent sensitivity factor, which may consider, for example, cross sections, gamma-ray multiplicities, gamma-ray detector 26 and/or 28 response, and/or atomic weight. In step 100, various physical properties of the element, environment, and/or tool may be accounted by applying a proper scaling factor. In step 102, based on the above considerations, a partial density of the element in the formation 50 may be obtained.

As noted above, steps 96-102 may involve processing that may take place in a processor embedded in the downhole tool and/or in the data processing system 14. Specifically, steps 96-102 may be carried out by calculating, for example, Equation (4) below. The partial density for a given element i may be described as follows:

$$\rho_i = A_i/S_i * f \quad (4),$$

where $S_i$ is the element-dependent sensitivity that accounts for, among other things, cross sections, gamma-ray multiplicities, gamma-ray detector 26 and/or 28 response, and/or atomic weight, and f is a scaling factor.

By way of example, the scaling factor f may be a constant determined from a first principle calculation, which may be derived from the physical constants of the particular element (e.g., mass) and/or other physical information of the environment (e.g., bulk density). Additionally or alternatively, the scaling factor f may be derived, or contain a fraction, from a calibration against measurements under certain predetermined or well-known conditions. In one embodiment, the factor f may be a constant with formation 50 depth.

To allow for additional adjustments to compensate for secondary effects not accounted for in the calculation of absolute yields $A_i$, as described above, the scaling factor f may be a function, rather than a constant. Effects that may be accounted for by employing the scaling factor f as a function may include, for example, remaining instrumental effects like gamma-ray detector 26 and/or 28 drifts and/or resolution degradation. Additionally or alternatively, such effects may further include environmental effects that have not been previously accounted for in the computation of absolute yields $A_i$, from the measured raw data. By way of example, environmental effects that arise from temperature and/or pressure, and which have not been accounted for among the factors F in Equations (1) or (2), may be accounted for by employing a scaling factor function f that accounts for such effects.

The determined partial elemental densities of the formation 50 may be verified using a variety of techniques. In one example, the sum of all measurable partial densities $\Sigma_i(\rho_{F,i})$ correlated with the formation 50 may be smaller than or equal to the bulk density $\rho_{b,eff}$ of the formation 50, as described by the following relationship:

$$\Sigma_i(\rho_{F,i}) \leq \rho_{b,eff} \quad (5).$$

In general, because not all elements of the formation 50 may be measured using the techniques described herein, the sum of all measurable partial densities $\Sigma_i(\rho_{F,i})$ will be smaller than the bulk density $\rho_{b,eff}$ of the formation 50 in most cases.

Figure 6:
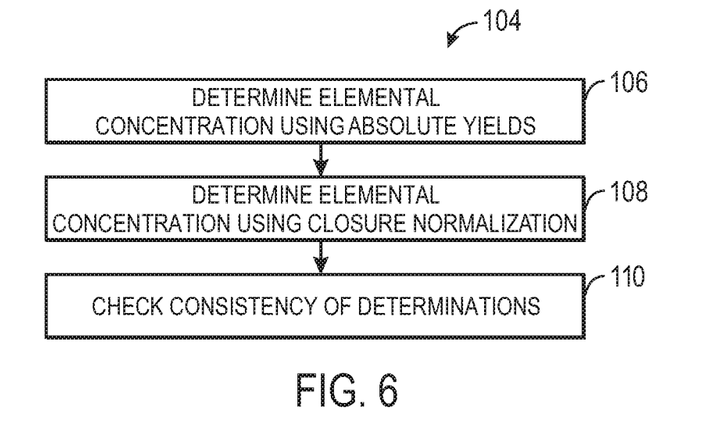
FIG. 6 is a flowchart describing an embodiment of a method for verifying the absolute elemental concentrations using oxide-closure techniques and relative yields, in accordance with an embodiment.

In another example, depicted by a flowchart 104 of FIG. 6, the determined elemental concentration results based on absolute yields $A_i$ may be checked for consistency using techniques involving relative yields. Specifically, in a first step 106, an elemental concentration of the formation 50 may be determined based on the techniques involving absolute yields, as described above. In a second step 108, the elemental concentration of the formation 50 may be determined based on techniques involving elemental closure or oxide closure with relative yields, as described below with reference to Equations (6) and (7), and/or Equation (8). In step 110, the elemental concentration may be verified. In some embodiments, the verification step 110 may involve combining the elemental concentration determined based on relative yields with the elemental concentration determined based on absolute yields to obtain a weighted mean of the results, where the weighting may be constant or adjusted based on confidence estimates.

Such techniques for oxide closure may be used as a secondary estimate of elemental concentrations to verify the calculated partial densities $\rho_i$ based on absolute yields $A_i$, as described above. The oxide closure procedure may utilize neutron capture spectroscopy data along with independent measurements of aluminum (Al) and potassium (K). The model may assume that the formation 50 elements detected by the neutron capture spectroscopy measurements can be quantitatively linked to their oxides or a most common form in the formation, and that all the oxides will sum to unity. The model takes the form of the following relationship:

$$X_K W_K + X_{Al} W_{Al} + F\{\Sigma X_i(Y_i/S_i)\} = 1 \quad (6),$$

where $X_i$ is the factor that converts an element to its oxide or most common association (for example, Ca is commonly converted to $CaCO_3$ instead of CaO), W is the weight fraction of the element in the formation, Y is the relative yield of the element derived from the capture spectrum, and S is a pre-determined measurement sensitivity that depends on the capture cross section of the specific element and the sensitivity of the tool to the characteristic radiation of that element. After solving for F, the weight fraction of each element may be computed as:

$$W_i = F \times Y_i/S_i \quad (7).$$

Additionally or alternatively, the approach described above may be used for spectra resulting from the inelastic gamma-rays 58. Using the above-described approach, several elements can be measured using inelastic spectral yields. These yields can be described as absolute elemental yields using normalization to the neutron source 18 output. Elements like Al, Mg, Ca, Si, S may be present in both the inelastic gamma-ray 58 and neutron capture gamma-ray 62 spectra. The use of absolute, environmentally corrected yields makes it possible to combine the results from inelastic gamma-ray 58 and neutron capture gamma-ray 62 spectra or to use the inelastic spectra as a standalone solution.

In a manner similar to the comparison of absolute and relative spectral yields due to neutron capture gamma-rays 62, inelastic absolute yields and inelastic relative yields due to inelastic gamma-rays 58 can be compared and, where appropriate, combined in a weighted average yield. Additionally, the absolute inelastic yields due to inelastic gamma-rays 58 and the neutron capture yields due to neutron capture gamma-rays 62 for elements present in both inelastic and capture spectra can be used to improve the accuracy and precision of the above answer. The environmental corrections for the inelastic yields also may be simpler, as the inelastic yields may be unaffected by the thermal neutron capture cross section of the formation 50 or the borehole 52. This makes inelastic yields particularly valuable in the presence of high borehole 52 salinity and an associated high neutron capture cross section.

Additionally or alternatively, a second closure model may be employed for verifying the calculated partial densities $\rho_i$ based on absolute yields $A_i$, which may be specifically used in cases where only neutron capture spectroscopy data are available, which may be described in U.S. Pat. No. 5,471,057, "METHOD AND APPARATUS FOR DETERMINING ELEMENTAL CONCENTRATIONS FOR GAMMA RAY SPECTROSCOPY TOOLS," which is incorporated by reference herein in its entirety. This model may be identical to the model illustrated by Equations (6) and (7) above, except that it eliminates the aluminum (Al) and potassium (K) terms. Additionally, this model modifies the association factors $(X_i)$ to account for the lack of aluminum (Al) and potassium (K) measurements, as described by the following relationship:

$$F\{\Sigma X_i(Y_i/S_i)\} = 1 \quad (8).$$

After obtaining an elemental concentration of the formation with a technique involving absolute yields and obtaining the elemental concentration of the formation using an oxide closure technique, the two calculations may be checked against one another. Thereafter, the elemental concentration determined based on absolute yields may be combined with the elemental concentration determined based on relative yields and oxide closure to obtain a weighted mean of the results. This weighted mean may have constant weight or a confidence-estimate-adjusted weight. The comparison of the elemental concentrations based on relative yields and closure with the elemental concentrations based on absolute yields may also be used to determine the scaling factor f, by forcing the two derived concentrations to agree in known or simple zones, or over a large portion of the total measured region.

While only certain features have been illustrated and described herein, many modifications and changes will occur to those skilled in the art. It is, therefore, to be understood that the appended claims are intended to cover all such modifications and changes as fall within the true spirit of the present disclosure.

What is claimed is:

1. A system comprising:
    a downhole tool comprising:
        a neutron source configured to emit neutrons into a subterranean formation to cause inelastic scattering events and neutron capture events;
        a neutron monitor configured to detect a count rate of the emitted neutrons; and
        a gamma-ray detector configured to obtain gamma-ray spectra deriving at least in part from inelastic gamma-rays produced by the inelastic scattering events and neutron capture gamma-rays produced by the neutron capture events; and
    data processing circuitry configured to determine a relative elemental yield from the gamma-ray spectra and to determine an absolute elemental yield based at least in part on a normalization of the relative elemental yield to the count rate of the emitted neutrons;
    wherein the absolute yield of the element is determined by:

$$A_i = Y_i * TotCR * F(\text{parameter-1}, \text{parameter-2}, \ldots)/nCR \quad (1)$$

wherein $A_i$ represents the absolute yield for an element i, $Y_i$ represents the relative elemental yield for the element i, TotCR represents a total count rate within a region of the spectra used in determining the relative yield, nCR represents the detected count rate of the emitted neutrons, and F represents an environmental correction factor accounting for borehole and/or formation parameters.

2. The system of claim 1, wherein the data processing circuitry is configured to determine the absolute elemental yield based at least in part on the environmental correction factor that accounts at least in part for environmental effects on the emitted neutrons, the inelastic gamma-rays, the neutron capture gamma-rays, or any combination thereof.

3. The system of claim 1, wherein the data processing circuitry is configured to determine the absolute elemental yield based at least in part on the environmental correction factor that accounts at least in part for:
    a fraction of the emitted neutrons that may escape from a region of the subterranean formation that the gamma-ray detector is sensitive to;
    geometrical effects on a variation in neutron flux in the region of the subterranean formation that the gamma-ray detector is sensitive to;
    geometrical effects on a solid angle of the region of the subterranean formation that the gamma-ray detector is sensitive to;
    attenuation of the inelastic gamma-rays and the neutron capture gamma-rays in the subterranean formation;
    a thermal neutron flux in the region of the subterranean formation that the gamma-ray detector is sensitive to; or
    an epithermal thermal neutron flux in the region of the subterranean formation that the gamma-ray detector is sensitive to; or
    any combination thereof.

4. The system of claim 1, wherein the data processing circuitry is configured to determine the absolute elemental yield based at least in part on the environmental correction factor that is a function of one or more parameters relating to one or more physical characteristics of the subterranean formation.

5. The system of claim 1, wherein the data processing circuitry is configured to determine the absolute elemental yield based at least in part on the environmental correction factor that is a function of one or more parameters relating to one or more physical characteristics of the subterranean formation, wherein the one or more parameters comprises:
    a porosity of the subterranean formation;
    a slowing-down time of the subterranean formation;
    a density of the subterranean formation;
    a thermal neutron capture cross-section of the subterranean formation;
    a thermal neutron capture cross-section of a borehole in the subterranean formation;
    an estimate of neutron flux at a region of the subterranean formation that the gamma-ray detector is sensitive to;
    an estimate of neutron energy distribution at the region of the subterranean formation that the gamma-ray detector is sensitive to;
    a raw count rate from the neutron monitor; or
    a raw gamma-ray count rate from the gamma-ray detector; or
    any combination thereof.

6. The system of claim 1, wherein the data processing circuitry is configured to determine the absolute elemental yield based at least in part on a product of the relative elemental yield multiplied by a quotient of a total gamma-ray count within a region of the gamma-ray spectra used to extract the relative yield divided by the count rate of the emitted neutrons.

7. A method comprising:
    emitting, using a neutron source, a known approximate quantity of neutrons into a subterranean formation to cause inelastic scattering events and neutron capture events;
    measuring, using a gamma-ray detector, gamma-ray spectra from inelastic gamma-rays caused by the inelastic scattering events and neutron capture gamma-rays caused by the neutron capture events;
    determining, using a processor, a relative yield of an element from the gamma-ray spectra; and
    determining, using the processor, an absolute yield of the element based at least in part on a normalization of the relative yield of the element to the known approximate quantity of emitted neutrons;
    wherein the absolute yield of the element is determined by:

$$A_i = Y_i * TotCR * F(\text{parameter-1}, \text{parameter-2}, \ldots)/nCR \quad (1)$$

wherein $A_i$ represents the absolute yield for an element i, $Y_i$ represents the relative elemental yield for the element i, TotCR represents a total count rate within a region of the spectra used in determining the relative yield, nCR represents the known approximate quantity of neutrons, and F represents an environmental correction factor accounting for borehole and/or formation parameters.

8. The method of claim 7, comprising determining, using the processor, a concentration of the element in the subterranean formation based at least in part on the absolute yield and an element-dependent sensitivity.

9. The method of claim 8, wherein the concentration of the element is determined based at least in part on the element-dependent sensitivity, wherein the element-dependent sensitivity is configured to account for:
   a cross-section of the element; gamma-ray multiplicities associated with the element;
   a response of the gamma-ray detector to gamma-rays deriving from the element; or
   an atomic weight of the element; or
   any combination thereof.

10. The method of claim 7, comprising determining, using the processor, a concentration of the element in the subterranean formation based at least in part on the absolute yield and a scaling factor.

11. The method of claim 10, wherein the concentration of the element is determined based at least in part on the scaling factor, wherein the scaling factor comprises:
   a constant derived from a physical constant of the element and a physical characteristic of the formation;
   a constant derived from a calibration of a downhole tool containing the neutron source and the gamma-ray detector;
   a constant containing a fraction from the calibration of the downhole tool containing the neutron source and the gamma-ray detector against measurements in known conditions; or
   a constant dependent on depth; or
   any combination thereof.

12. The method of claim 10, wherein the concentration of the element is determined based at least in part on the scaling factor, wherein the scaling factor is a function configured to compensate for environmental effects or instrumental effects related to a degradation of gamma-ray detector capabilities, or a combination thereof.

13. The method of claim 7, comprising determining, using the processor, a concentration of the element in the subterranean formation based at least in part on the absolute yield of the element, an element-dependent sensitivity, and a scaling factor.

14. The method of claim 7, comprising determining, using the processor, a concentration of the element in the subterranean formation based at least in part on the absolute yield of the element and determining, using the processor, a concentration of the element in the subterranean formation based at least in part on an elemental closure or oxide closure of the relative yield of the element.

15. The method of claim 14, comprising determining, using the processor, a weighted mean of the concentration of the element in the subterranean formation based at least in part on the absolute yield of the element and the concentration of the element in the subterranean formation based at least in part on the elemental closure or oxide closure of the relative yield of the element, wherein the weighting of the weighted mean is constant or adjusted based on confidence estimates.

16. The method of claim 14, comprising determining, using the processor, a scaling factor for concentration of the element in the subterranean formation based at least in part on a comparison of the absolute yield of the element to the concentration of the element in the subterranean formation based at least in part on the elemental closure or oxide closure of the relative yield of the element.

17. The method of claim 7, wherein the neutron source is configured to emit a known approximate quantity of neutrons using a calibrated radioactive source that emits neutrons at a predictable rate.

18. The method of claim 7, comprising:
   determining, using the processor, a relative yield of an element in the subterranean formation from the gamma-ray spectra;
   determining, using the processor, a relative yield of the element in the borehole from the gamma-ray spectra; and
   determining, using the processor, a partial absolute yield of the element in the subterranean formation based at least in part on a normalization of the relative yield of the element in the subterranean formation to the known approximate quantity of emitted neutrons and determining, using the processor, a partial absolute yield of the element in the borehole based at least in part on a normalization of the relative yield of the element in the borehole to the known approximate quantity of emitted neutrons.

19. The method of claim 18, wherein the absolute yield of the element is determined by:

$$A_i = A_{F,i} + A_{BH,i} \qquad (2)$$
$$= (Y_{F,i} * F_F(\text{parameter-1, parameter-2, } \ldots) + Y_{BH,i} *$$
$$F_{BH}(\text{parameter-1, parameter-2, } \ldots)) * TotCR/nCR.$$

wherein Ai represents the absolute yields for element i; AFi and ABHi represent the partial absolute yields of the element i in the formation and borehole, respectively; $Y_{Fi}$ and $Y_{BHi}$ represent the relative elemental yields of the formation and borehole, respectively; TotCR represents a total count rate within a region of the spectra used in determining the relative yields; nCR represents the known approximate quantity of neutrons; and $F_F$ and $F_{BH}$ represent environmental correction factors accounting for formation and borehole parameters, respectively.

* * * * *